United States Patent [19]

Smith

[11] 4,077,102

[45] Mar. 7, 1978

[54] TUBE EXTRACTING MECHANISM

[75] Inventor: Joseph W. Smith, Dayton, Ohio

[73] Assignee: Carrier Corporation, Syracuse, N.Y.

[21] Appl. No.: 700,355

[22] Filed: Jun. 28, 1976

[51] Int. Cl.² ........................................... B23P 19/04
[52] U.S. Cl. ................................................... 29/252
[58] Field of Search ........................... 29/252, 202 R

[56] References Cited

U.S. PATENT DOCUMENTS

| | | | |
|---|---|---|---|
| 1,506,886 | 9/1924 | Clay | 29/252 |
| 1,964,023 | 6/1934 | Armstrong | 29/252 |
| 2,697,872 | 12/1954 | Armstrong | 29/252 |
| 3,367,011 | 2/1968 | Sipher | 29/252 X |
| 3,369,287 | 2/1968 | Brochetti | 29/252 |
| 3,387,353 | 6/1968 | Romero | 29/252 |
| 3,791,011 | 2/1974 | Keys | 29/252 |
| 3,916,499 | 11/1975 | Frame et al. | 29/252 |
| 3,986,246 | 10/1976 | Gemmill | 29/252 |

*Primary Examiner*—James L. Jones, Jr.
*Assistant Examiner*—J. T. Zatarga
*Attorney, Agent, or Firm*—J. Raymond Curtin; Barry E. Deutsch

[57] ABSTRACT

A mechanism and method for extracting a tube from a tube sheet includes expandable jaws positioned within the inner bore of the tube. An expansion device is connected to a first piston of the extraction mechanism whereby the expansion device expands the jaws into engagement with the inner surface of the tube. The jaws are expanded by providing a fluid at a predetermined pressure to the inner piston. While the fluid pressure is maintained on the inner piston, a second force is generated by supplying fluid under pressure to an outer piston having the jaws connected to an end thereof, whereby the outer piston is moved to extract the tube from its tube sheet.

1 Claim, 6 Drawing Figures

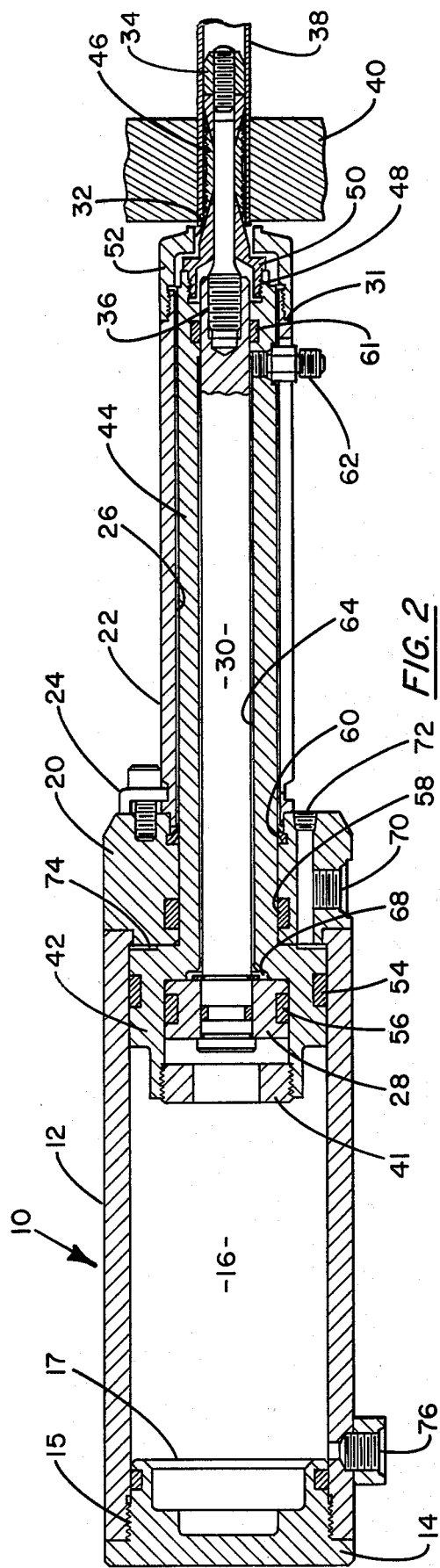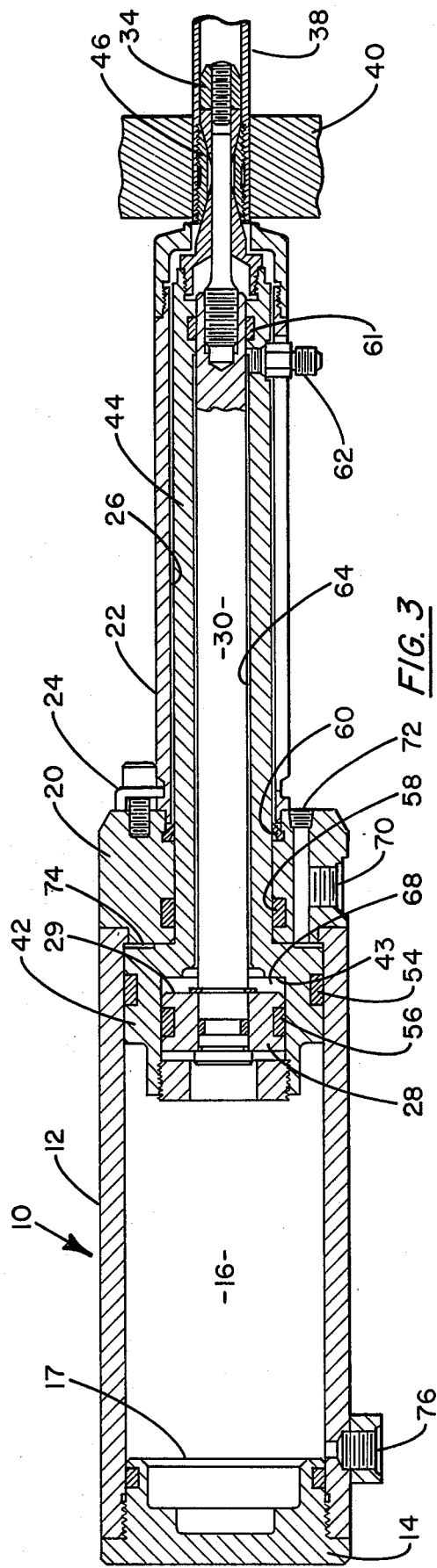

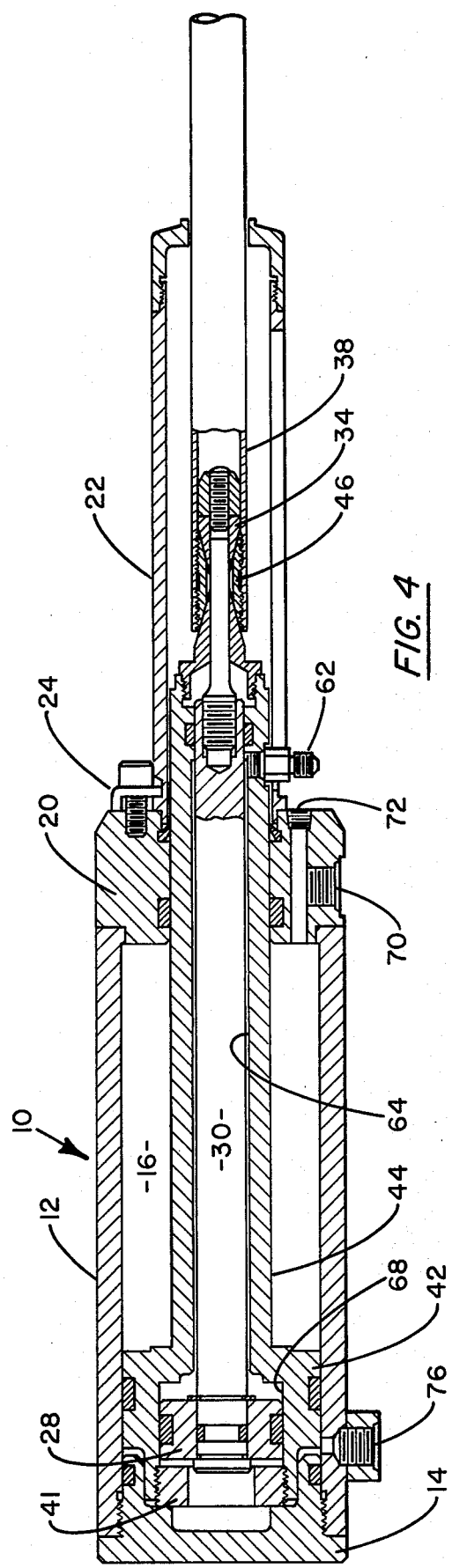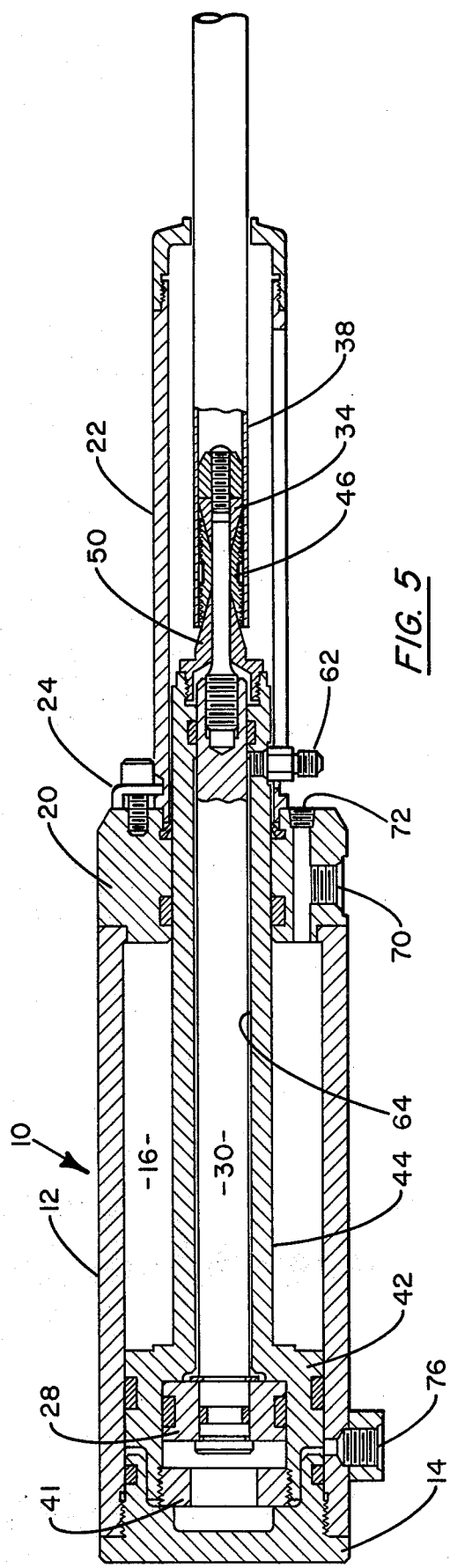

TUBE EXTRACTING MECHANISM

BACKGROUND OF THE INVENTION

This invention relates to a mechanism and method for extracting tubes from a tube sheet, and in particular, to a mechanism and method which compensates for variations, due to manufacturing tolerances, in the inside diameters of tubes being extracted from the sheet.

Heat exchange tubes are employed in heat exchange equipment of many types wherein the number of tubes used in any given unit may vary from one to literally hundreds. Typically, the tubes employed in heat exchangers are expanded into tube sheets or members.

At times, due to malfunctions or normal maintenance, it is necessary to replace one or even all of the tubes used in a given heat exchange unit. As may be readily recognized, the replacement of a tube requires that the heat exchange unit be removed from the particular cycle in which it is normally employed. Depending upon the installation, the removal of the heat exchanger from operation may result in either inefficient operation or total stoppage of the cycle. As is obvious, in such cases, the removal and replacement of the tubes must be accomplished as expeditiously as possible.

Even in installations wherein the temporary elimination of the heat exchanger from the cycle may not be critical, as for example where standby units are available, it is desirable that the tubes be removed as quickly as possible to minimize labor and related expenses.

Heretofore, various mechanisms have been employed for extracting tubes; however, such devices have not been entirely satisfactory for one or more reasons. In U.S. Pat. No. 3,369,287, there is disclosed a tube extracting mechanism which uses fluidic pressure to operate a first cylinder to expand a plurality of jaws into engagement with the inner surface of a tube. A second cylinder is thereafter actuated by fluid under pressure to extract the tube from its tube sheet. Extraction devices of this type are not entirely satisfactory since the jaws are expanded to a preset diameter, which does not take into account variations in the diameter of tubes due to such causes as manufacturing tolerances. In some cases, by expanding the jaws to a preset diameter, the tube and surrounding surface of the tube sheet may be damaged due to over expansion of the jaws; whereas in other cases, the jaws may be insufficiently expanded whereby the extraction of the tubes may become unduly difficult.

SUMMARY OF THE INVENTION

It is an object of this invention to manufacture a tube extraction mechanism of simple, durable construction.

It is a further object of this invention to extract tubes from a tube sheet by providing a mechanism which securely grips the inside surface of a tube without causing damage thereto to prevent damage from occurring to the tube sheet.

It is yet another object of this invention to develop a predetermined force between the jaws of the extraction mechanism and the inside surface of several tubes, irrespective of any variations in the diameter of the several tubes.

It is yet another object of this invention to generate a predetermined hydraulic pressure in the extraction device to expand the jaws thereof into engagement with the inner surface of the tube to be extracted.

These and other objects of the present invention may be obtained in a mechanism for extracting tubes from a tube sheet including an elongated housing formed with a central opening in an end which is positioned in proximity to the tube. The housing has an axially extending passage in communication with the central opening. First piston means is reciprocally disposed in the passage and has its outer surface spaced from the inner surface of the housing. Expansion means is connected to the first end of the piston means for movement therewith. Second piston means is reciprocally disposed in the passage means between the housing and the first portion means and has a first end terminating in proximity to the central opening of the housing. Expandable jaw means are connected to the first end of the second piston means and extend into the bore of the tube. Hydraulic supply means including a source of fluid and passage means in the housing in communication with the fluid source supply the fluid to the first piston means to generate a force acting thereon to move the piston means and expansion means connected thereto relative to the jaw means to expand the jaw means outwardly into engagement with the inner surface of the tube. The supply means includes pressure responsive means to prevent the force from exceeding a predetermined magnitude. The supply means further includes second passage means in the housing to supply the fluid to the second piston means to generate a force acting thereon to move the second piston means away from the central opening to extract the tube from its supporting tube sheet.

BRIEF DESCRIPTION OF THE DRAWINGS

FIGS. 2 through 5 are longitudinal sectional views of the extraction mechanism illustrating the mechanism in various stages of operation.

DESCRIPTION OF THE PREFERRED EMBODIMENT

Referring now to the various figures of the drawings, there is shown a preferred embodiment of the present invention. In referring to the various figures of the drawings, like numerals shall refer to like parts.

Figure 1:
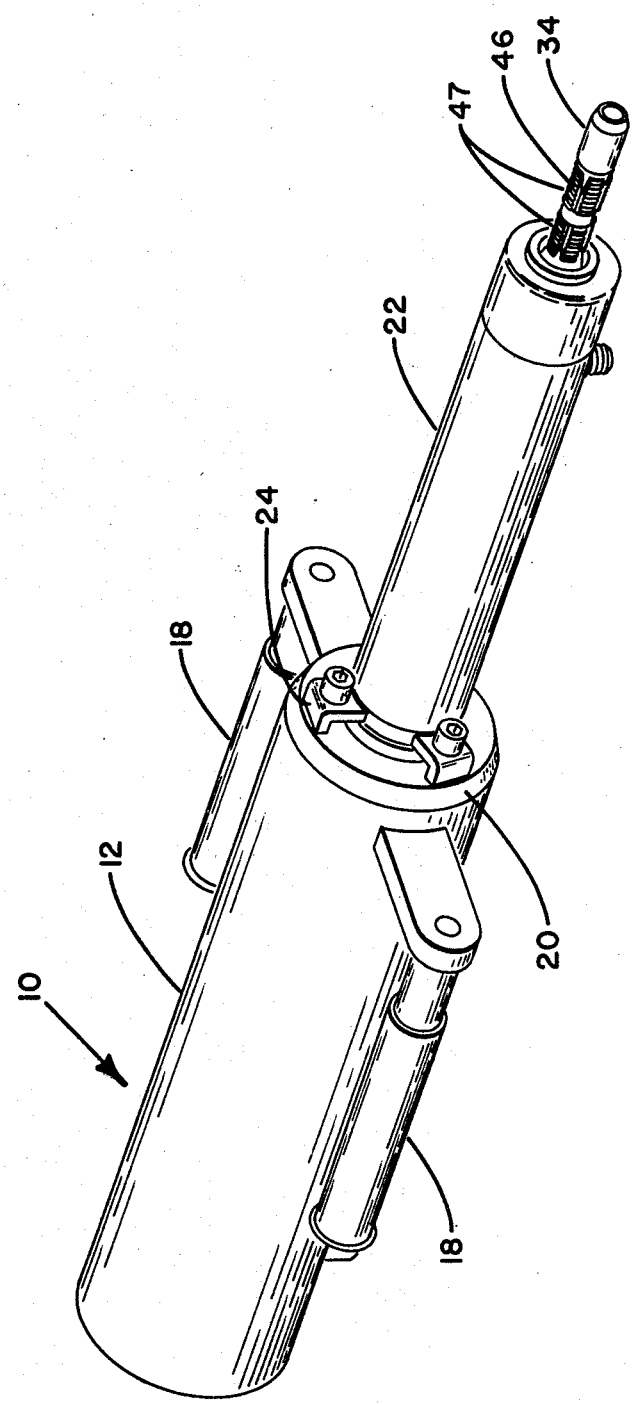
FIG. 1 is a perspective view of an extraction mechanism in accordance with the present invention.

Referring particularly to FIGS. 1 and 2, there is illustrated a tube extracting mechanism in accordance with the present invention. The extracting mechanism 10 includes a cylindrical housing section 12 having a cap 14 connected by suitable means, as for example screw threads 15 to one end of housing section 12. Housing section 12 defines an axially extending inner passage 16.

Grips 18, illustrated in FIG. 1, may be suitably connected to the external surface of housing section 12, as for example by welding, to permit an operator to easily manipulate tube extracting mechanism 10. The grips 18 may be formed from suitable material, such as rubber. Housing section 12 has a washer-like cover 20 connected thereto, as for example by welding. Cover 20 is suitably joined by clamps 24 to a second, smaller axially extending housing section 22. The use of the three separable sections to define the extraction mechanism housing simplifies the manufacture thereof. Cover 20 and housing section 22 include an axially extending passage 26 which functions as an extension of passage 16.

A first or inner piston 28 which includes an axially extending rod 30, is disposed in passages 16 and 26. The outer surface of rod 30 is spaced from the inner surface of housing section 22 to define a space therebetween. Rod 30 terminates in proximity to central opening 32 in one end 31 of housing section 22. Expansion means 34, illustrated as a conical shaped member, is suitably connected, as for example by a threaded tapped hole for receiving a threaded end of the expansion means, to the end 36 of rod 30 for movement therewith. As illustrated, expansion means 34 extends axially within the inner bore of a tube 38 that is to be extracted from its supporting tube sheet 40. Tube 38 is expanded within an appropriate opening provided in tube sheet 40. A cylindrical retaining or safety member 41 is provided to prevent inner piston 28 from moving beyond a predetermined distance within passage 16.

A second or outer piston 42, including an axially extending portion 44, is provided within passages 16 and 26. Axially extending portion 44 is disposed in the space provided between housing section 22 and rod 30. The inner surface of axially extending portion 44 and the outer surface of rod 30 define therebetween an axially extending annular passage 64.

Expandable jaw means 46 is connected to end 48 of outer piston 42 by adapter member 50. Thus, jaw means 46 is reciprocally movable in response to the movement of outer piston 42. Jaw means 46 includes gripping teeth 47 formed on the exterior surface thereof.

A nose piece 52 is connected to the end 31 of housing section 22 and acts to locate and position the extracting mechanism relative to the tube sheet.

Various seals, for example O-rings 54, 56, 58, 60, and 61 are utilized at various points of the extracting mechanism for reasons that will become apparent hereinafter.

A hydraulic fitting or connector 62 is suitably joined to housing section 22 in proximity to end 31 thereof. Fitting 62 is in fluid flow communication with annular passage 64. An annular chamber 68 is defined between surface 29 of inner piston 28 and surface 43 of outer piston 42. (See in particular FIG. 3.) Passage 64 terminates at chamber 68.

A second hydraulic fitting or connector 70 is suitably joined to cover 20. Hydraulic fitting 70 is in fluid flow communication with passage means 72 which terminates in an annular chamber 74 formed between facing surfaces of piston means 42 and cover 20. A third hydraulic connector or fitting 76 is joined to housing section 12 to permit fluid to flow into the far end 17 of passage 16.

Figure 6:
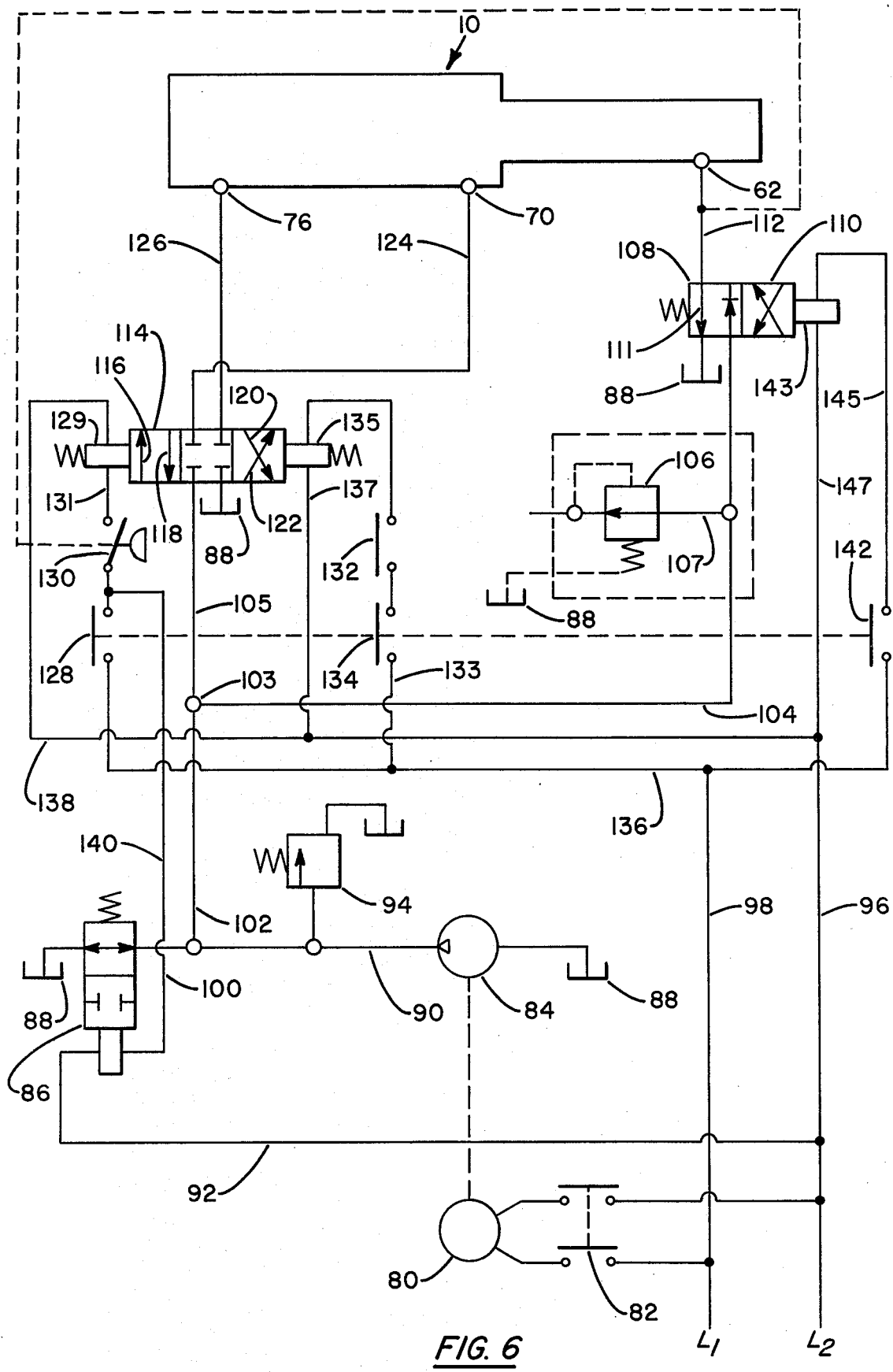
FIG. 6 is a schematic view of the control circuit of the extraction mechanism in accordance with the present invention.

Referring now to FIG. 6, there is disclosed a control circuit to operate the extraction mechanism heretofore described. The control circuit for extracting mechanism 10 is preferably electro-hydraulic and includes a motor 80 connected through a switch 82 to a source of electrical energy represented by lines L1 and L2. Motor 80 is provided to operate pump 84. Pump 84 is connected to a source of fluid represented by reservoir 88. The discharge from pump 84 flows through line 90 and passes through a solenoid actuated dump valve 86 back to reservoir 88 when the solenoid is deenergized. When valve 86 is energized, the fluid passage therethrough is prevented and the hydraulic fluid from pump 84 is directed through line 102 to the junction 103 of lines 104 and 105. A line 107 connects line 104 to pressure reducing valve 106. Pressure reducing valve 106 is provided for a reason to be more fully explained hereinafter. The fluid flowing through line 104 is then directed to a four-way solenoid actuated valve 108. Depending upon whether the valve is energized or deenergized, the fluid directed thereto will either pass therethrough to line 112 and thence to hydraulic connector 62, or the flow will terminate at the valve.

The flow through hydraulic line 105 will pass to a four-way solenoid actuated valve. Depending upon the mode of operation of the valve, the flow will either pass therethrough through line 116 and thence into line 124 which communicates with fluid connector 70, or pass therethrough via line 122 to line 126 in communication therewith, or when the valve is deenergized, fluid flow therethrough will be terminated. Line 126 is in fluid flow communication with hydraulic connector 76.

The electrical portion of the control includes conductors 98 and 136, with conductor 136 having a normally open switch 128 connected therein. When switch 128 is closed, electrical current is passed therethrough via line 140 to energize solenoid 86.

A switch 130 is connected via conductors 131 and 138 in series with coil 129 of solenoid 114. The closure of switches 128 and 130 will cause coil 129 to be energized to place solenoid 114 in a first operating mode. The electrical portion of the system further includes switches 132 and 134 which are connected in series, via conductors 133 and 137, with coil 135 of solenoid 114. The closures of switches 132 and 134 will result in the energization of coil 135 to place solenoid 114 in a second operating mode.

The electrical portion of the control further includes a normally open switch 142 connected in series, via conductors 145 and 147, with coil 143 of solenoid 108. The closure of switch 142 will cause coil 143 to be energized and thereafter function in a manner to be more fully described.

The method of extracting a tube from its tube sheet when using mechanism 10 will now be explained in detail. Referring particularly to FIG. 2, mechanism 10 is illustrated in the position whereat jaws 46 and expansion member 34 have been positioned within the bore of tube 38.

At this time, switch 82 of the electrical portion of the control circuit is closed to energize motor 80 and to cause pump 84 to deliver a fluid from reservoir 88. In addition, switch 128 is manually closed to energize solenoid 86 to prevent flow therethrough to reservoir 88 and instead, cause the hydraulic fluid supplied by pump 84 to pass through line 102 and thence through line 104 to the "upstream" side of solenoid 108. Pressure reducing valve 106, in line 107, functions to prevent the pressure of the fluid passing through line 104 to solenoid 108 from exceeding a predetermined magnitude. At this time, switch 142 is closed to thereby energize coil 143 of solenoid 108. With coil 143 energized, flow will pass through the solenoid via line 110 to line 112 in communication therewith. Thus, fluid is delivered to connector 62.

The fluid passing to connector 62 is supplied via passage 64 to chamber 68. The fluid provides a force acting on piston 28 which moves the piston and rod 30, attached thereto to the left, as illustrated in FIG. 2, to the position illustrated in FIG. 3. As will be observed, expansion means 34 will thus be drawn into engagement with the inner surface of jaws 46 as a result of the movement of piston 28 and rod 30. Due to the conical shape of expansion means 34, the force acting on piston 28 generated by the pressurized fluid in chamber 68 must be increased to move the rod and piston means to the left, once expansion means 34 has initially been brought into engagement with jaws 46. As expansion means 34 moves inwardly within the jaws, the force required to obtain further movement increases. In effect, the force is a function of the diameter of the tube; the tube and expansion means generate a frictional force tending to oppose the hydraulic force acting on piston 28. Valve 106 in line 107 functions to permit the pressure of the fluid delivered to chamber 68 to attain a predetermined magnitude; once the predetermined pressure has been obtained, the valve opens to prevent this pressure from being exceeded. Thus, a predetermined force is developed by the fluid in chamber 68 acting on piston 28 whereby jaws 46 will always be expanded by the same amount relative to any tube being withdrawn from a tube sheet.

As indicated hereinabove, FIG. 3 illustrates the position of the expander means 34 relative to jaws 46 after the predetermined force has moved inner piston 28 for expansion purposes. Annular safety member 41 is provided to prevent inner piston 28 from moving beyond a predetermined distance within passage 16. In most cases, safety means 41 will not be needed.

With reference to FIGS. 4 and 6, the extraction mechanism is illustrated in a position whereat the tube is withdrawn from its tube sheet. To obtain the position illustrated in FIG. 4, switch 130 is closed. Switch 130 may either be closed manually or may be closed in response to the predetermined pressure being obtained in line 112. Once switch 130 is closed to energize coil 129, solenoid 114 is moved to a position to permit flow through line 116 to line 124. This will permit fluid to pass into connector 70. Passage means 72 in communication therewith, delivers the fluid into chamber 74 to generate a force acting on piston 42 to move the piston to the left as illustrated in FIG. 4. Since jaws 46 are connected to outer piston 42 via adapter 50, the movement of the outer piston to the left will cause the jaws and tube to move also to the left to cause the tube to be withdrawn from its tube sheet. At this time, it will be observed that inner piston 28 and rod 30 will move together with the outer piston since the hydraulic pressure is maintained in chamber 68 to maintain the proper expansion force on jaws 46. The tube is extracted from its tube sheet a distance equal to the travel of the pistons in passages 16 and 26. Any fluid in passage 16 will be forced therefrom via connector 76 which is in communication with reservoir 88 via line 118.

When the tube has been withdrawn from its tube sheet, switches 132 and 134 are closed to thereby energize coil 135 of solenoid 114. This will result in the solenoid being moved to a position to permit flow from line 105 to line 126 via line 122 and thence to fluid connector 76. The fluid delivered via connector 76 will develop a hydraulic force acting on inner piston 28 to move the piston to the right as illustrated in FIG. 5, to cause expansion means 34 to be withdrawn from jaws 46 to relax the jaws relative to the tube. The tube may then be freely removed from the extraction mechanism. During this step of the tube extraction operation, any fluid in chamber 68 will be forced therefrom and returned to reservoir 88 via lines 111, and 112. To obtain this reverse flow through solenoid 108, switch 142 should be opened to deenergize coil 143.

When it is desired to reinsert the mechanism into a next tube, the supply of fluid is continued to be fed through connector 76 to cause both the expansion means and the jaws to be inserted within the bore of the tube via the respective movements of inner piston 28 and outer piston 42. At this time, fluid in chamber 74 will be returned to reservoir 88 via lines 124 and 120.

By providing a fluid that develops a predetermined pressure acting on inner piston 28, the expansion of jaws 46 relative to any given tube will be constant to provide a constant withdrawal or gripping force on tubes being extracted from a tube sheet. This will prevent the jaws from being overexpaned into engagement with the tubes, whereby the tube sheet may be damaged or ruined, and on the other hand, will insure that a sufficient withdrawal force is generated between the tube and the outer surface of the jaws.

While a preferred embodiment of the present invention has been described and illustrated, the invention should not be limited thereto, but may be otherwise embodied within the scope of the following claims.

I claim:
1. A mechanism for extracting tubes from a tube sheet comprising:
   housing means formed with a central opening in one end and positioned in proximity to said tube, said housing means having a passage extending axially thereof in communication with said opening;
   inner piston means reciprocally disposed in said housing passage in spaced relation to the inner surface of said housing, a first end of said piston means extending through said central opening;
   expansion means connected to said first end of said pg,14 inner piston means for movement therewith;
   outer piston means disposed in said housing passage in said space defined between said inner surface of said housing and said inner piston means and having a first end terminating in proximity to said central opening;
   expandable jaw means connected to said first end of said outer piston means and extending into the bore of said tube;
   hydraulic supply means including a source of fluid and first passage means in communication with said fluid source to supply said fluid to said inner piston means to thereby generate a force acting thereon to move said piston means in said passage away from said central opening to bring said expansion means into engagement with said jaw means to expand said jaw means outwardly into engagement with the inner surface of said tube, said supply means further including a pressure relief valve to prevent the hydraulic pressure acting on said inner piston from exceeding a predetermined magnitude; and second passage means communicating with said source of fluid to deliver said fluid to said outer piston including a pressure sensitive switch responsive to the pressure of said fluid in said first passage means to cause the fluid to flow through said second passage means when the pressure acting on said inner piston means attains said predetermined magnitude, said fluid in said second passage means developing a force acting on said outer piston means to move said piston means away from said central opening to extract said tube from said tube sheet; and
   safety means disposed within said housing passage in spaced relation to an end wall thereof for preventing said inner piston means from moving beyond a predetermined distance within said housing passage when said force is acting thereon.

* * * * *